United States Patent
Mieritz et al.

(10) Patent No.: US 10,612,526 B2
(45) Date of Patent: Apr. 7, 2020

(54) FULLY INSULATED TIP UNIT FOR A LIGHTNING PROTECTION SYSTEM FOR A WIND TURBINE BLADE AND A WIND TURBINE BLADE COMPRISING THE SAME

(71) Applicant: PolyTech A/S, Bramming (DK)

(72) Inventors: Casper Falkenstrøm Mieritz, København V (DK); Kim Bertelsen, Ulfborg (DK); Søren Find Madsen, Hvalsø (DK); Thomas Holm Krogh, Klovborg (DK)

(73) Assignee: PolyTech A/S, Bramming (DK)

( * ) Notice: Subject to any disclaimer, the term of this patent is extended or adjusted under 35 U.S.C. 154(b) by 68 days.

(21) Appl. No.: 15/526,535

(22) PCT Filed: Nov. 14, 2014

(86) PCT No.: PCT/DK2014/050386
§ 371 (c)(1),
(2) Date: May 12, 2017

(87) PCT Pub. No.: WO2016/074677
PCT Pub. Date: May 19, 2016

(65) Prior Publication Data
US 2017/0321661 A1    Nov. 9, 2017

(51) Int. Cl.
*H02G 13/00* (2006.01)
*F03D 80/30* (2016.01)
*F03D 1/06* (2006.01)

(52) U.S. Cl.
CPC .............. *F03D 80/30* (2016.05); *F03D 1/06* (2013.01); *H02G 13/80* (2013.01); *Y02E 10/72* (2013.01); *Y02E 10/721* (2013.01)

(58) Field of Classification Search
CPC .......... F03D 80/30; F03D 1/06; F03D 1/0675; F03D 13/00; F03D 13/10; F03D 11/0033; H02G 13/00; H02G 13/40; H02G 13/80
(Continued)

(56) References Cited

U.S. PATENT DOCUMENTS

| | | | |
|---|---|---|---|
| 6,979,179 B2 * | 12/2005 | Møller Larsen | F03D 80/30 415/4.3 |
| 2009/0053062 A1 * | 2/2009 | Arinaga | H02G 13/00 416/146 R |
| 2012/0269631 A1 * | 10/2012 | Lewke | F03D 80/30 416/146 R |

FOREIGN PATENT DOCUMENTS

| | | |
|---|---|---|
| EP | 2 226 497 A1 | 9/2010 |
| JP | 2012-87753 A | 5/2012 |

(Continued)

OTHER PUBLICATIONS

International Search Report completed Jul. 21, 2015 for International Application No. PCT/DK2014/050386.
(Continued)

*Primary Examiner* — Hai H Huynh
*Assistant Examiner* — Gonzalo Laguarda
(74) *Attorney, Agent, or Firm* — Nixon & Vanderhye P.C.

(57) ABSTRACT

A fully insulated tip unit (1) for a lightning protection system for a wind turbine blade (2) is disclosed, comprising an electrically conducting tip (3), which tip consists of an external part (4) and an internal part (5), at least one side receptor base (6), an internal tip unit conductor (8), an insulated electric cable (9) for forming the outermost part of a down conductor (10), and a connection element (12) for establishing electrical connection between the insulated electric cable and the other conducting parts of the tip unit, wherein the internal part of the tip, the side receptor base(s), the internal tip conductor, the connection element and one
(Continued)

end of the insulated electric cable are all embedded by casting in an insulating material (13) leaving only the external part of the tip and the other end of the insulated electric cable uncovered by the insulating material. Furthermore, a wind turbine blade comprising such a tip unit is disclosed.

31 Claims, 8 Drawing Sheets

(58) Field of Classification Search
USPC .................. 416/61, 146 R; 415/118, 119
See application file for complete search history.

(56) References Cited

FOREIGN PATENT DOCUMENTS

| NL | 2 010 553 C | 10/2014 |
|---|---|---|
| WO | WO 2002/048546 A1 | 6/2002 |
| WO | WO 2013/084370 A1 | 6/2013 |
| WO | WO 2015/055214 A1 | 4/2015 |

OTHER PUBLICATIONS

Examination Report dated Jun. 28, 2019 in Indian Application No. 201737014847, 5 pages.

\* cited by examiner

FULLY INSULATED TIP UNIT FOR A LIGHTNING PROTECTION SYSTEM FOR A WIND TURBINE BLADE AND A WIND TURBINE BLADE COMPRISING THE SAME

This application claims the benefit under 35 U.S.C. § 371 of International Application No. PCT/DK2014/050386, filed Nov. 14, 2014, which is incorporated by reference herein in its entirety.

The present invention relates to a tip unit for a lightning protection system for a wind turbine blade, which tip unit comprises a tip receptor and at least one side receptor embedded together into one unit covered by an electrically insulating material.

BACKGROUND OF THE INVENTION

Most known lightning protection systems for wind turbine blades comprise one or more internally arranged down conductors and a number of lightning receptors arranged on the external surface of the blade.

It is a well-known problem of such systems, that lightning strikes do not only attach to the wind turbine blade in the intended positions, i.e. on the external attachment points, the so-called lightning receptors, but can also strike the internal conductive parts of the lightning protection system directly through the structure of the blade. Such incidents can cause severe structural damage to the wind turbine blade due to the large amounts of energy typically released in relation to lightning impacts.

Another well-known problem is that external lightning receptors of lightning protection systems can be damaged by lightning impacts and that, therefore, the lifetime of such receptors is limited, depending on the number of lightning impacts to which they are subjected.

BRIEF DESCRIPTION OF THE INVENTION

It is an object of the present invention to provide a tip solution for a lightning protection system for a wind turbine blade, which overcomes at least partly the above-mentioned disadvantages of solutions known in the art.

The present invention relates to a fully insulated tip unit for a lightning protection system for a wind turbine blade, said tip unit comprising an electrically conducting tip for a wind turbine blade, which tip consists of an external part and an internal part, the external part forming a tip receptor, at least one side receptor base made from an electrically conducting material for mechanical mounting of one or more side receptors arranged on the external surface of the blade in such a way that electrical connection is established between the respective side receptor(s) and the side receptor base(s), an internal tip unit conductor for forming an electrical connection between the internal part of the tip receptor and the side receptor base(s), an insulated electric cable for forming the outermost part of a down conductor extending internally within the wind turbine blade in the longitudinal direction thereof from the at least one side receptor base towards the root end of the blade, and a connection element for establishing electrical connection between the insulated electric cable and the other conducting parts of the tip unit, wherein the internal part of the tip, the side receptor base(s), the internal tip conductor, the connection element and one end of the insulated electric cable are all embedded by casting in an insulating material leaving only the external part of the tip and the other end of the insulated electric cable uncovered by the insulating material.

By using a tip unit configured as described above, it is obtained that the risk of impact of lightning strikes directly to the internal parts of the lightning protection system, i.e. through the wind turbine blade structure, is eliminated or at least significantly reduced in the tip part of the wind turbine blade.

In an embodiment of the invention, the insulated electric cable is an unshielded high-voltage cable.

The use of a high-voltage cable is advantageous in that such cables are provided with the sufficient cable insulation for withstanding large potential differences like the ones occurring in the case of impact of a lightning strike.

In an embodiment of the invention, the connection element is integrated in the at least one side receptor base.

Integration of the connection element in a side receptor base results in a lower number of components and less points of electric connections within the tip unit.

In an embodiment of the invention, the internal tip unit conductor is formed by a part of the insulated electric cable.

Letting a part of the insulated cable form the internal tip unit conductor results in a lower number of components and less points of electric connections within the tip unit.

In an embodiment of the invention, the cable insulation has been removed from the part of the insulated electric cable forming the internal tip unit conductor.

Removing the cable insulation from the part of the insulated electric cable forming the internal tip unit conductor facilitates an easier and simpler production process for the tip unit.

In an embodiment of the invention, the distance between the outermost point of the external part of the tip and the centre of the side receptor base nearest the tip is between 0.3 meters and 2 meters, preferably between 0.8 meters and 1.2 meters.

The described distance ranges allows for an optimised distance between the tip receptor and the closest side receptor of the wind turbine blade.

In an embodiment of the invention, the distance between the centre of the side receptor base furthest away from the tip and the point where the insulated electric cable leaves the cast part of the tip unit is between 0.1 meters and 0.5 meter, preferably between 0.15 meters and 0.3 meters.

The described distance ranges have proven to ensure the sufficient protection against direct lightning strikes impact to the internal parts of the tip unit.

In an embodiment of the invention, the external part of the tip is releasably attached to the remaining part of the tip unit.

The use of a releasably attached external part of the tip allows for replacement of the external part, i.e. of the tip receptor of the lightning protection system, if it has been damaged destroyed by the impact of too many and/or too severe lightning strikes.

In an embodiment of the invention, the external part and the internal part of the tip are integrated into one common part.

Integrating the external and the internal parts of the tip unit into one common part results in a lower number of components and less points of electric connections within the tip unit.

In an embodiment of the invention, the tip unit is attached to the wind turbine blade by the means of an adhesive.

Using an adhesive for attaching the tip unit to the wind turbine blade means that no structural part of the wind turbine blade needs to be penetrated or in other ways weakened in relation to the attachment.

In an embodiment of the invention, the insulation material used for the casting comprises at least one material from the list comprising: polymeric materials, polymer nanocomposites, thermoplastic materials, thermoset materials, insulating foams or any combination thereof.

The described types of materials have proven to comprise a number of materials with the required mechanical and electrical properties needed for this purpose.

In an embodiment of the invention, the minimum thickness of the cast insulation material is between 3 mm and 30 mm, preferably between 5 mm and 15 mm.

The described thickness ranges have proven to ensure the sufficient insulation for avoiding direct lightning strikes impact to the internal parts of the tip unit.

In an embodiment of the invention, the insulation material used for the casting is dimensioned to withstand potential differences of at least 20 kV, preferably at least 200 kV between the outer surface of the tip unit and the conducting parts inside the tip unit.

Protection against potential differences within the described ranges has proven to be sufficient for obtaining the desired protection against direct impact of lightning strikes to the internal parts of the tip unit.

In an embodiment of the invention, the external part of the tip consists at least partly of copper or a copper alloy.

The use of copper ensures a very high electric conductivity, high thermal conductivity and, hence, excellent properties for handling the arc attachment process. Furthermore, the use of copper enables for using exothermic welding processes on the external part of the tip.

In an embodiment of the invention, the external part of the tip consists at least partly of Tungsten Carbide.

The use of Tungsten Carbide ensures high electric conductivity, high thermal conductivity, very high melting temperature and, hence, low susceptance to charge erosion from the lightning strike. Particularly, coatings of Tungsten Carbide applied on other materials have a proven high performance to the long stroke components. The chemical stability of Carbides is high, meaning that the risk of corrosion-related problems is greatly reduced.

In an embodiment of the invention, the external part of the tip consists at least partly of steel.

The use of steel ensures a very high mechanical strength and reduces the risk of corrosion-related problems at a relatively low cost. Furthermore, the use of steel enables for using exothermic welding processes.

In an embodiment of the invention, the external part of the tip consists at least partly of aluminium.

The use of aluminium allows easy mechanical processing at a relatively low cost.

In an embodiment of the invention, the internal part of the tip consists at least partly of iron.

The use of iron ensures a high mechanical strength and allows easy mechanical processing at a relatively low cost. Furthermore, the use of iron enables for using exothermic welding processes.

In an embodiment of the invention, the internal part of the tip consists at least partly of copper.

The use of copper ensures a very high electric conductivity and reduces the risk of corrosion-related problems. Furthermore, the use of copper enables for using exothermic welding processes on the external part of the tip.

In an embodiment of the invention, the internal part of the tip consists at least partly of brass.

The use of brass means that at least some of the advantageous properties of copper can be obtained at lower costs and with a less ductile material. The use of corrosion-resistant brass ensures good compliance with harsh environments.

In an embodiment of the invention, the internal tip unit conductor is mechanically and electrically connected to the internal part of the tip by means of exothermic welding.

The use of exothermic welding results in a very strong mechanical connection and ensures a very good electric connection.

In an embodiment of the invention, the internal part of the tip consists at least partly of aluminium.

The use of aluminium allows easy mechanical processing at a relatively low cost.

In an embodiment of the invention, the internal tip unit conductor is mechanically and electrically connected to the internal part of the tip by means of a crimped connection, such as Contact Mandrel Crimping.

The use of Contact Mandrel Crimping results in a cost efficient mechanical and electric connection.

In an embodiment of the invention, the at least one side receptor base consists at least partly of aluminium.

The use of aluminium allows easy mechanical processing at a relatively low cost.

In an embodiment of the invention, the internal tip unit conductor and/or the insulated electric cable are mechanically and electrically connected to the at least one side receptor base by means of Contact Mandrel Crimping.

The use of Contact Mandrel Crimping results in a cost efficient mechanical and electric connection.

In an embodiment of the invention, the internal tip unit conductor and/or the insulated electric cable are mechanically and electrically connected to the at least one side receptor base by means of exothermic welding.

The use of exothermic welding results in a very strong mechanical connection and ensures a very good electric connection.

In an embodiment of the invention, wherein the insulated electric cable is terminated in a cable lug, which is bolted onto a side receptor base.

The use of a bolted cable lug results in a cost efficient and secure mechanical and electric connection.

In an embodiment of the invention, the desired outer geometry and dimensions of the tip unit for being used in a specific type of wind turbine blades is obtained through customisation of a standardised tip unit having a certain predefined geometry and minimum dimensions by adding extra material to the outer surface of the standardised tip unit.

The use of a customised standardised tip unit allows for a more standardised and, thereby, more cost efficient production.

In an embodiment of the invention, the added extra material is the same insulating material as is used for the casting of the tip unit and the casting of the tip unit and the addition of the extra material are done in one single process.

Adding the extra material as a part of the casting process results in a simpler and more cost-efficient production.

In an embodiment of the invention, the added extra material is a foam material added to fill up the cavity between the inner shell of a wind turbine blade and a standardised tip unit arranged therein.

Adding the extra material after arranging the standardised tip unit in the wind turbine blade increases the flexibility of the use of the tip unit in different types of wind turbine blades.

In another aspect of the invention, it relates to a wind turbine blade comprising a tip unit as described above.

FIGURES

In the following, a few exemplary embodiments of the invention are described in further detail with reference to the figures, of which

DETAILED DESCRIPTION OF THE INVENTION

Figure 1:
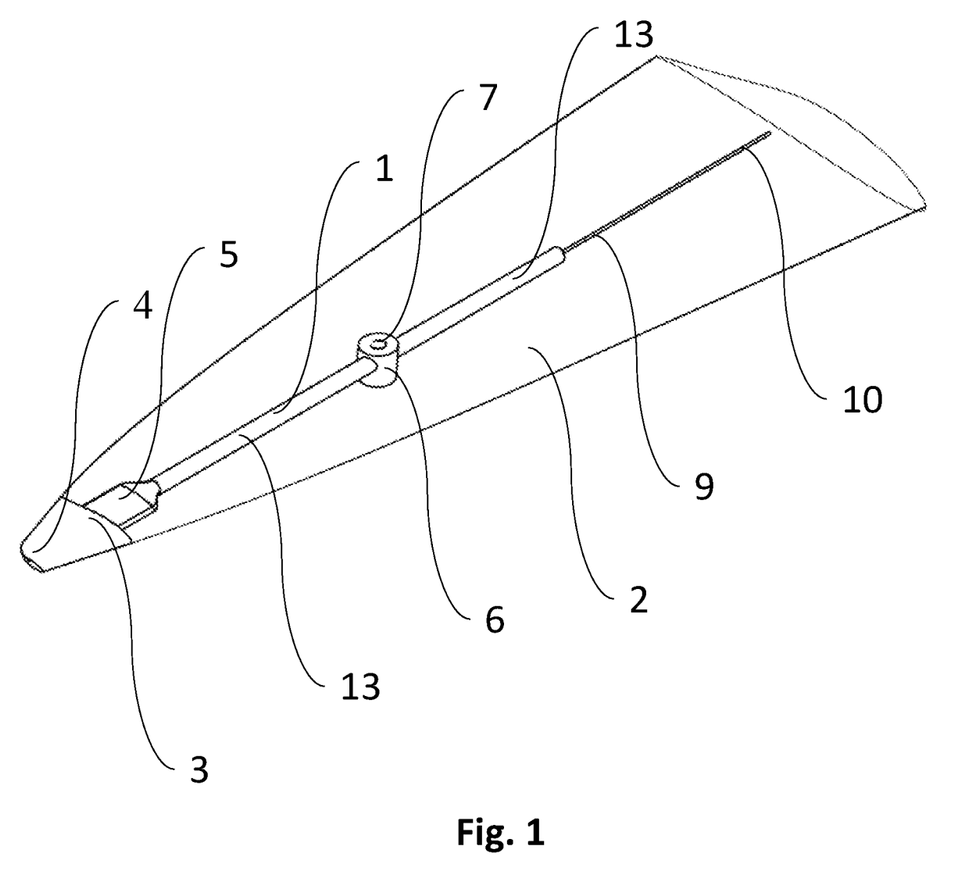
FIG. 1 is a schematic view of the tip part of a wind turbine blade with a tip unit according to an embodiment of the invention.

FIG. 1 shows how a tip unit 1 according to an embodiment of the invention may be arranged at the tip end of a wind turbine blade 2. Preferably, the tip unit 1 is attached to the wind turbine blade 2 by means of a suitable adhesive, such as 2-component epoxy adhesives, fast curing polyurethane adhesives, 2-component polyurethane adhesives, 2-component curing acrylate adhesives or other polymeric adhesives.

Figure 2A:
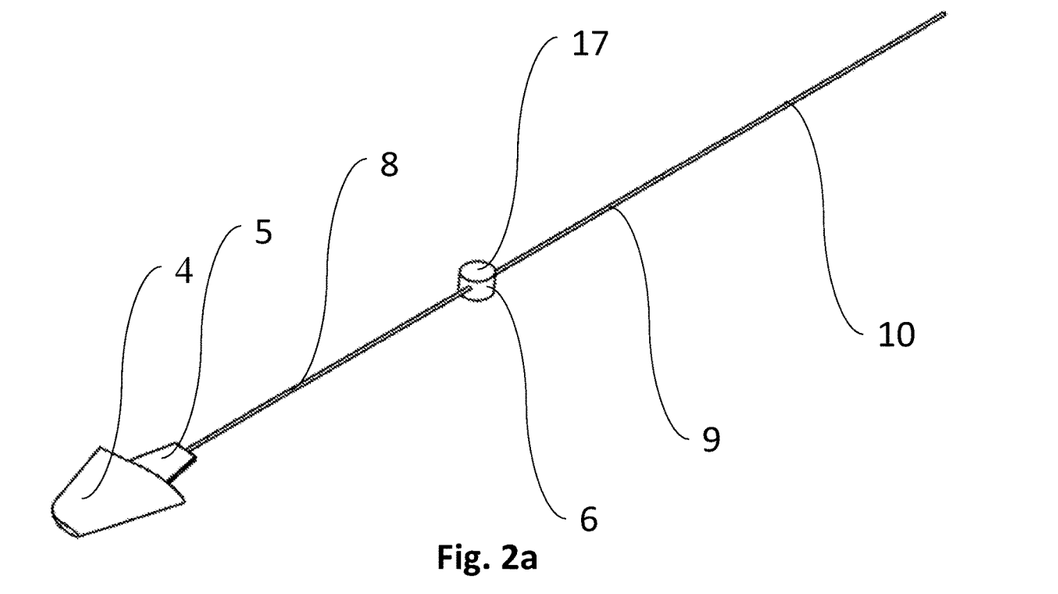
FIG. 2a is a perspective view of a tip unit according to an embodiment of the invention, from which the insulating material has been removed.
Figure 2B:
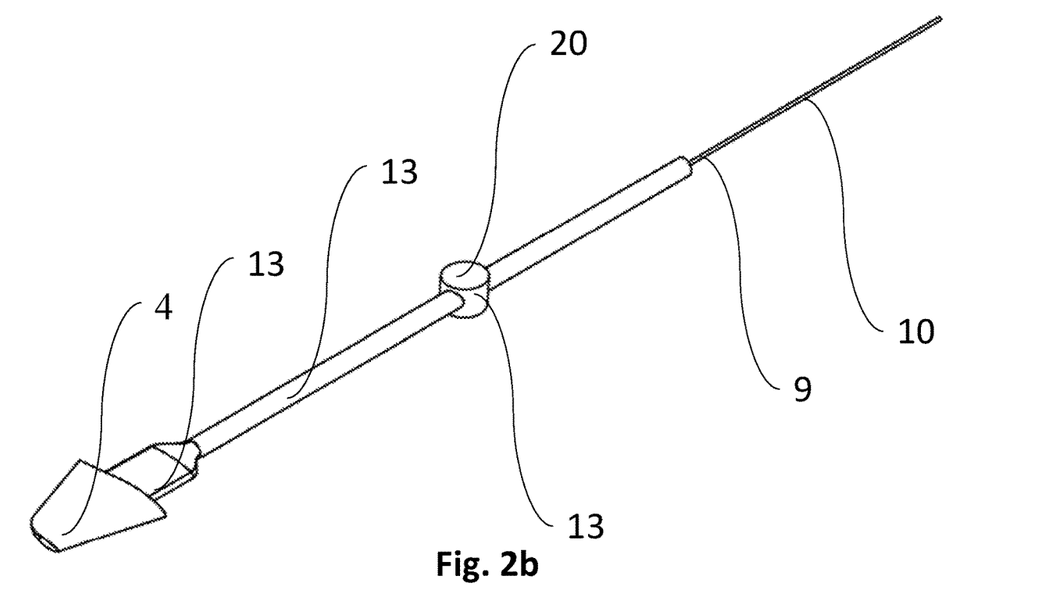
FIG. 2b is a perspective view of the tip unit shown in FIG. 2a including the insulating material.

The tip unit 1, which is described in further detail below with reference to FIGS. 2a and 2b is arranged with its longitudinal axis at least substantially parallel with the longitudinal axis of the wind turbine blade 2 in such a way that the external part 4 of the tip 3 forms the tip of the wind turbine blade 2 and the insulated cable 9 forms the outermost part of a down conductor 10 extending along the longitudinal axis of the wind turbine blade 2 in the direction of the root end thereof.

FIG. 2a is a perspective overview of a tip unit 1 according to an embodiment of the invention, from which the insulating material 13 has been removed. The illustrated tip unit 1 comprises four electrically conducting elements, namely an external 4 and an internal part 5 of the tip 3, which is electrically and mechanically connected to a side receptor base 6 through an internal tip unit conductor 8. The internal tip unit conductor 8 is connected to the side receptor base 6 by means of a connection element 12 integrated therein. An insulated electric cable 9, which forms the outermost part of a down conductor 10 of the lightning protection system of the wind turbine blade 2, is connected to the side receptor base 6 by means of the same connection element 12. Thus, all the electrically conducting parts 5, 6, 8, 9 of the tip unit 1 are electrically and mechanically connected to each other.

FIG. 2b shows the same tip unit 1 as FIG. 2a with the exception, that now the insulating material 13 has not been removed. Thus, apart from the part of the insulated electric cable 9 forming the down conductor 10 from the tip unit 1 and inwards towards the root end of the wind turbine blade 2 and an end part of the internal part 5 of the tip 3, all electrically conducting parts 5, 6, 8, 9 of the tip unit 1 are fully covered by an electrically insulating material 13, such as polymer nanocomposites, thermoplastic materials, thermoset materials insulating foams or any combination thereof. The thickness, geometry and material properties of this insulating material 13 is dimensioned to withstand the environmental conditions (vibrations, temperatures, temperature cycles, humidity, etc.) and the electric fields during lightning exposure and normal operation of the wind turbine blade.

Thus, there are only two ways, in which a lightning strike can reach the internal parts 5, 6, 8, 9 of the tip unit 1 and, thereby the part of the down conductor 10 extending through this part of the wind turbine blade 2. One is through a tip receptor of the lightning protection system formed by an external part 4 of the tip 3, which is connected mechanically and electrically to the internal part 5 of the tip 3 through the end part thereof, which is not covered by the electrically insulating material 13. The other way is through a side receptor 7 (not shown in this figure), which is arranged on the outer surface of the shell or to be flush with the shell surface of the wind turbine blade 2 and is not a part of the tip unit 1 itself. The side receptor 7 is mechanically and electrically connected to the side receptor base 6 through penetration of the shell 24 (not shown in this figure) of the wind turbine blade 2 and the electrically insulating material 13 covering the side receptor base 6. The fact that lightning strikes can only reach the internal lightning protection system through the tip receptor and side receptor 7 arranged on the outer surface of the wind turbine blade 2 means that no lightning strikes pass through the structural parts of this part of the wind turbine blade 2. Thereby, the risk of damage or even destruction of the structural parts of the tip of the wind turbine blade 2 is eliminated or at least significantly reduced.

At the ends of the cylinder-shaped parts of the tip unit 1 around the side receptor base 6, the insulating material 13 forms recesses in its surface for the placement of an adhesive material 23 (not shown in this figure) as described in further detail below with reference to FIGS. 8a and 8b.

Figure 3A:
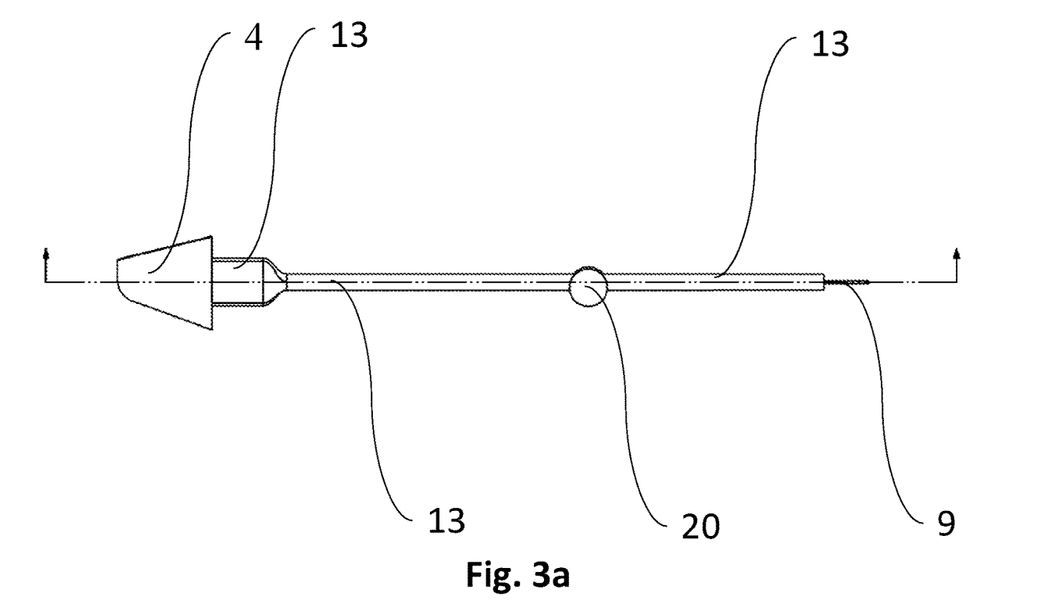
FIG. 3a is a side view of the tip unit shown in FIG. 2b.
Figure 3B:
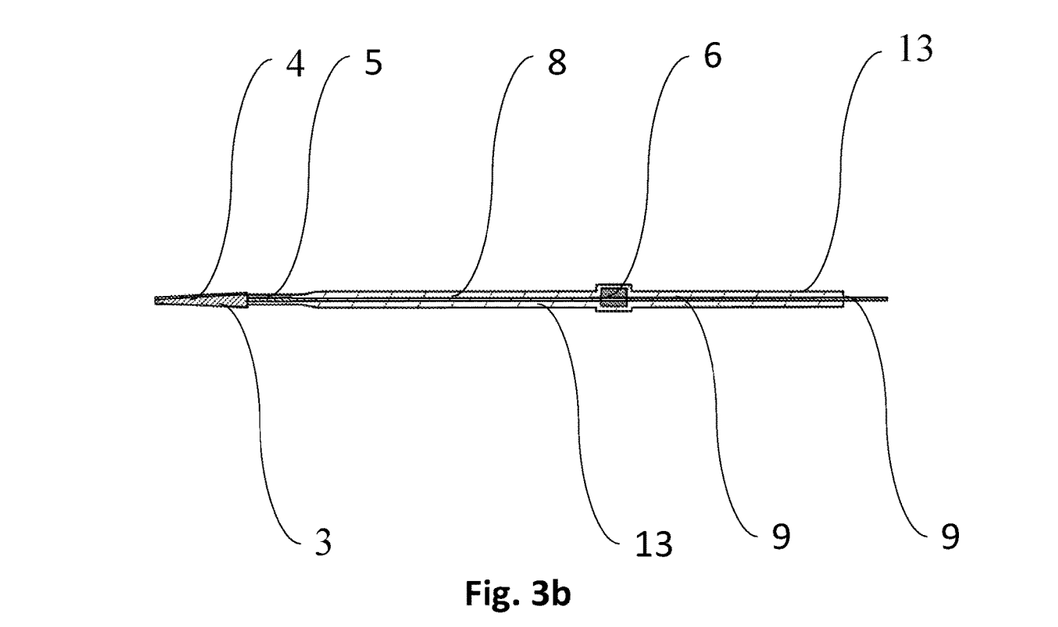
FIG. 3b is a cross-sectional view of the tip unit shown in FIG. 3a, FIG. 4a is a schematic view of the internal part of a tip of a tip unit according to a first embodiment of the invention.

FIGS. 3a and 3b are a side view and a cross-sectional view, respectively of the tip unit 1 shown in FIG. 2b.

Figure 4A:
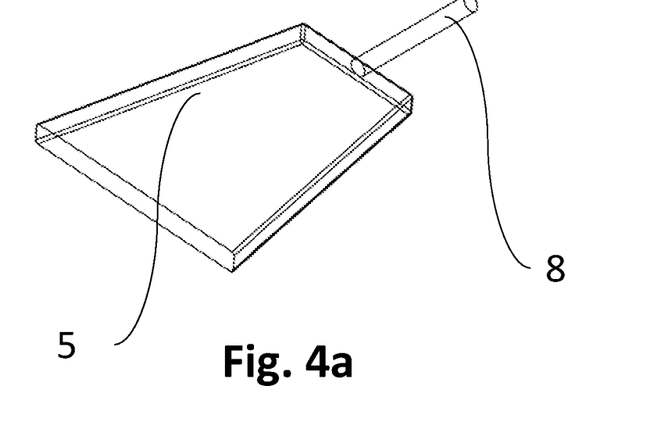

FIG. 4a is a schematic view of the internal part 5 of a tip 3 of a tip unit 1 according to a first embodiment of the invention. Depending on the electrically conducting material, from which the internal part 5 of the tip 3 is made, the internal tip unit conductor 8 can by mechanically and electrically connected to it using different methods, such as exothermic welding or crimped connections, for instance Contact Mandrel Crimping.

Figure 4B:
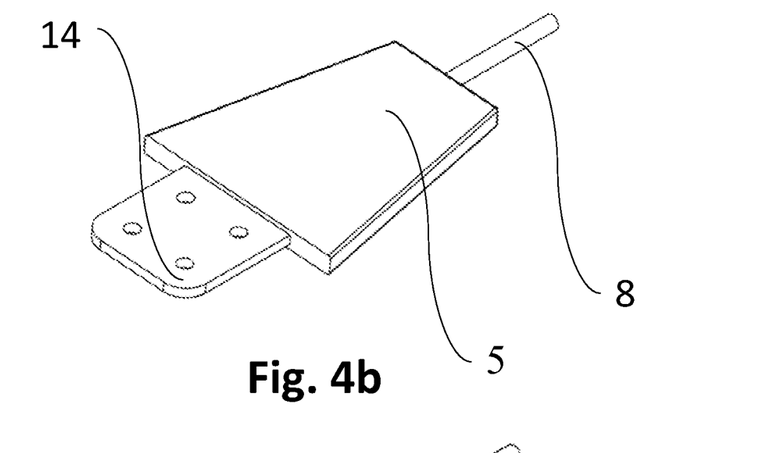
FIG. 4b is a schematic view of the internal part of a tip of a tip unit according to a second embodiment of the invention.

FIG. 4b is a schematic view of the internal part 5 of a tip 3 of a tip unit 1 according to a second embodiment of the invention. This embodiment differs from the one shown in FIG. 4a by the fact that the internal part 5 of the tip 3 is provided with a flange 14 for facilitating the attachment of an external part 4 (not shown) of the tip 3.

Figure 4C:
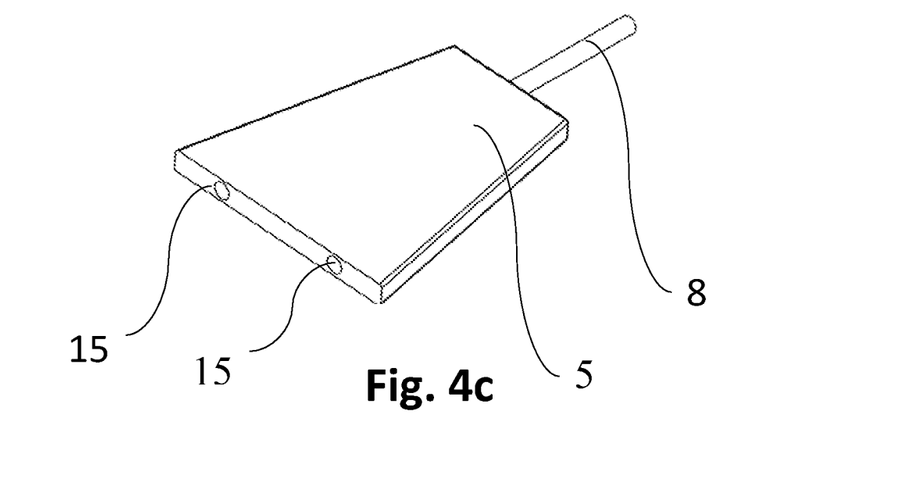
FIG. 4c is a schematic view of the internal part of a tip of a tip unit according to a third embodiment of the invention.

FIG. 4c is a schematic view of the internal part 5 of a tip 3 of a tip unit 1 according to a third embodiment of the invention. In this embodiment, the internal part 5 of the tip 3 is provided with a couple of mounting holes 15 for attachment of an external part 4 (not shown) of the tip 3.

Figure 5:
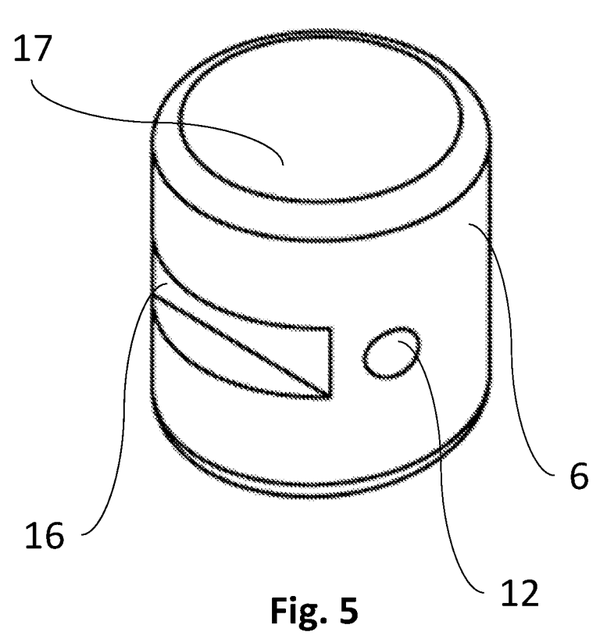
FIG. 5 is a schematic view of a side receptor base according to an embodiment of the invention.

FIG. 5 is a perspective view of a side receptor base 6 of a tip unit 1 according to an embodiment of the invention. Basically, the side receptor base 6 consists of a cylinder made of an electrically conducting material, such as for instance copper or aluminium. In the illustrated embodiment, a connection element 12 is integrated in the side receptor base 6 in the form of a through-bore 12. A recess 16 is made in the surface of the cylinder parallel to and in short distance from the through-bore 12 for making access for a pressing tool 18 (not shown in this figure) as described in further detail below in relation to FIGS. 6a and 6b. A side receptor 7 (not shown in this figure) can be mechanically and electrically connected to the side receptor base 6 by drilling/screwing a part of it into an end surface 17 of the side receptor base 6 through penetration of the shell of the wind turbine blade 2 and the electrically insulating material 13 covering the tip unit 1.

Figure 6A:
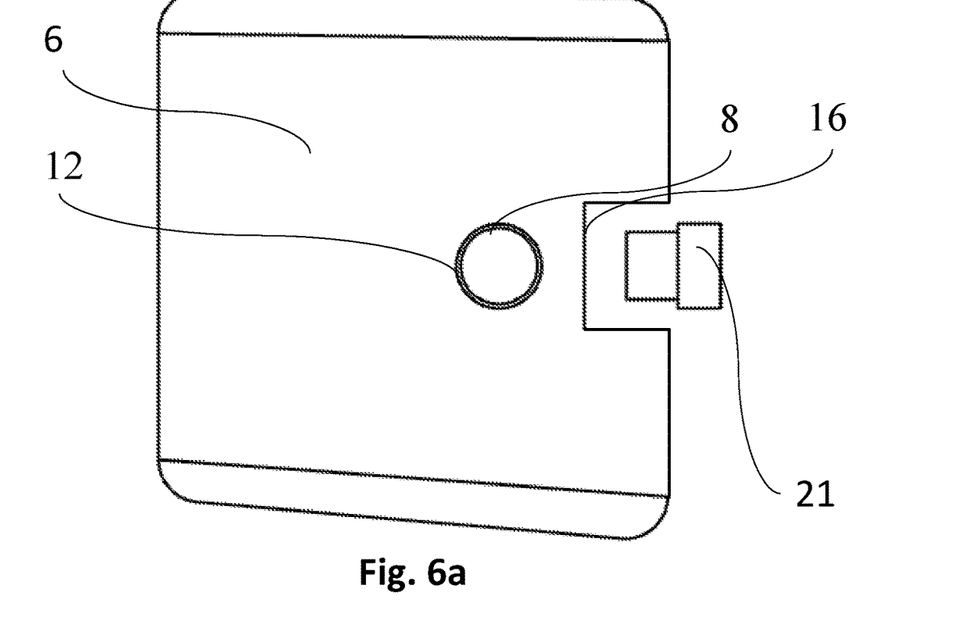
FIGS. 6a-6b illustrate schematically the making of the mechanical and electrical connection between the side receptor base shown in FIG. 5 and other electrically conducting parts of a tip unit according to an embodiment of the invention.
Figure 6B:
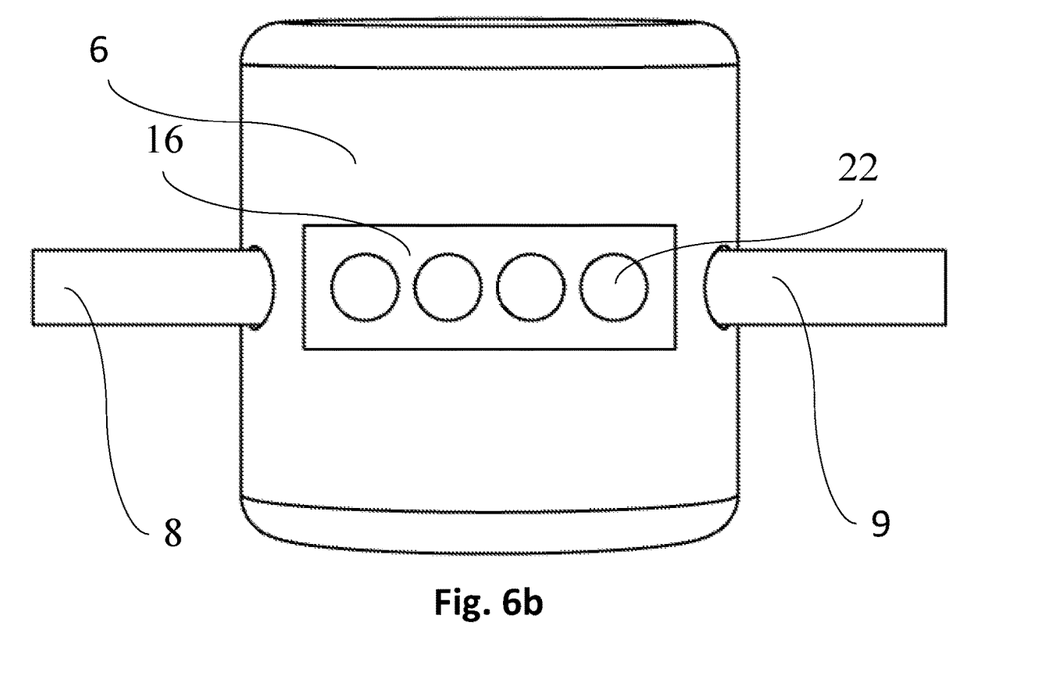

FIGS. 6a and 6b illustrate schematically the making of the mechanical and electrical connection between the side receptor base 6 shown in FIG. 5 and the internal tip unit conductor 8 and the insulated electric cable 9 of a tip unit 1 according to an embodiment of the invention.

The conducting parts 8, 9 are placed in the connection element 12 formed by the through-bore in the side receptor base 6, and a pressing tool 21 is used to press the relatively thin wall between the recess 16 and the through-bore 12 against the internal tip unit conductor 8 and the insulated electric cable 9, whereby a solid and reliable mechanical and electrical connection is formed between the side receptor base 6 and these conducting parts 8, 9. The work of the pressing tool 21 is illustrated schematically by the press marks 22 in FIG. 6b.

The two end surfaces of the cylinder forming the side receptor base 6 in the embodiment shown in FIG. 6a are slightly slanted in order to be aligned with the surfaces of the inner shell parts of the wind turbine blade 2 (not shown in this figure) when the tip unit 1 is mounted therein.

Figure 6C:
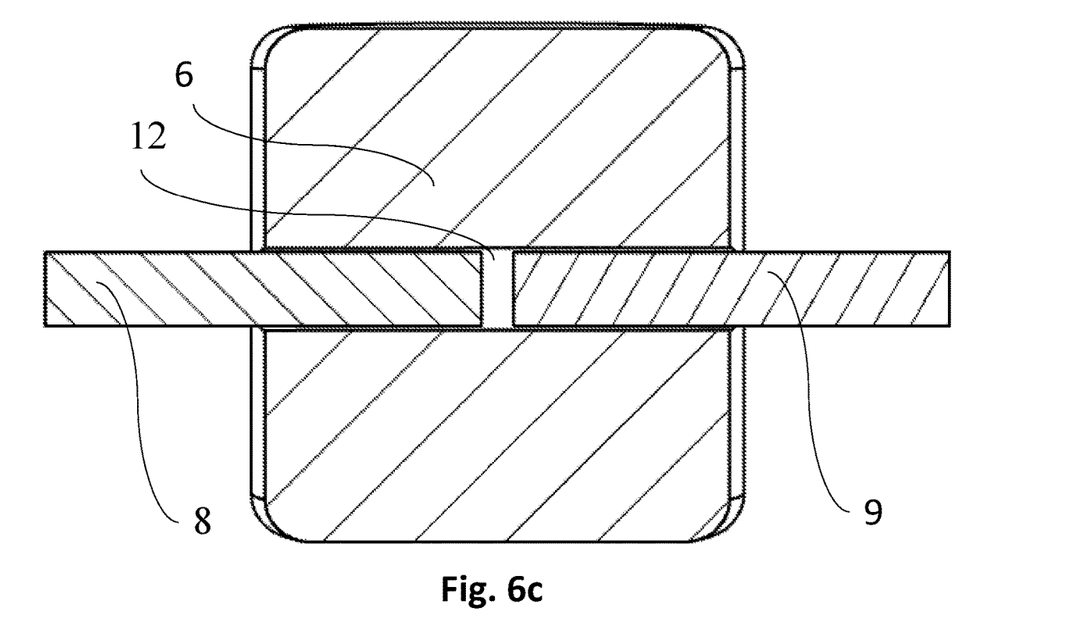
FIGS. 6c-6d are schematic cross-sectional views of the mechanical and electrical connection between the side receptor base shown in FIG. 5 and other electrically conducting parts of a tip unit according to two different embodiments of the invention.
Figure 6D:
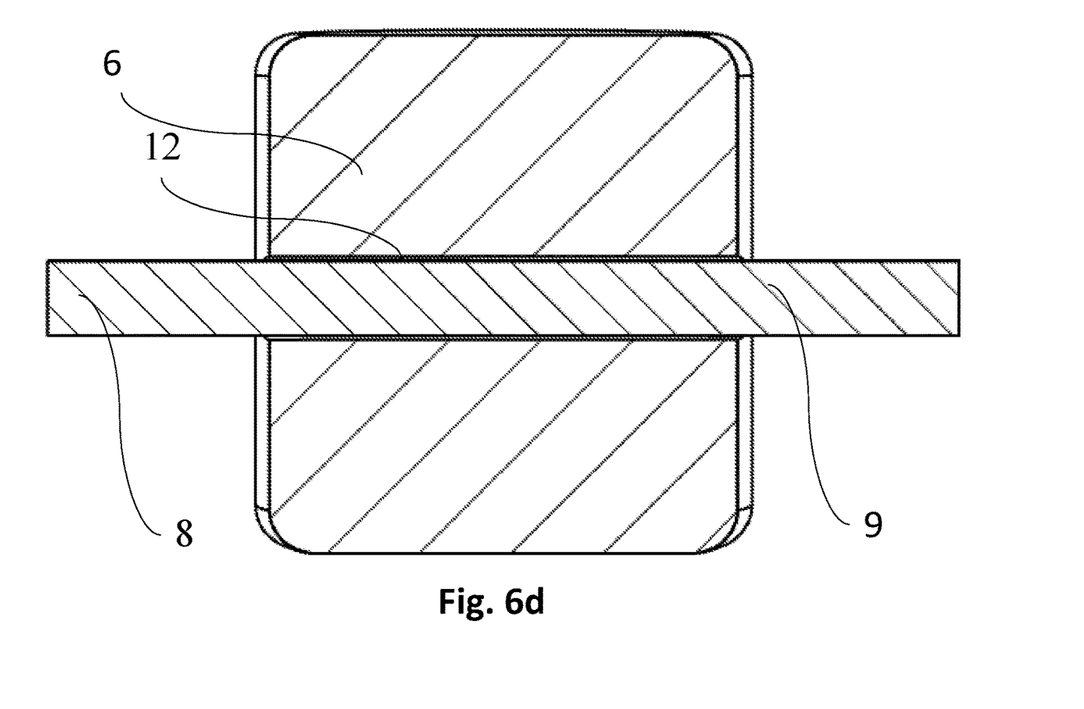

FIGS. 6c-6d are schematic cross-sectional views of the mechanical and electrical connection between the side receptor base 6 shown in FIG. 5 and other electrically conducting parts 8, 9 of a tip unit 1 according to two different embodiments of the invention.

In the first embodiment illustrated in FIG. 6c, the internal tip unit conductor 8 and the insulated electric cable 9 consist of two different parts placed into through-bore forming the connection element 12 from the two ends thereof, respectively. In the other embodiment illustrated in FIG. 6d, on the other hand, the internal tip unit conductor 8 and the insulated electric cable 9 are formed by the same physical cable passing all the way through the through-bore forming the connection element 12.

Figure 7A:
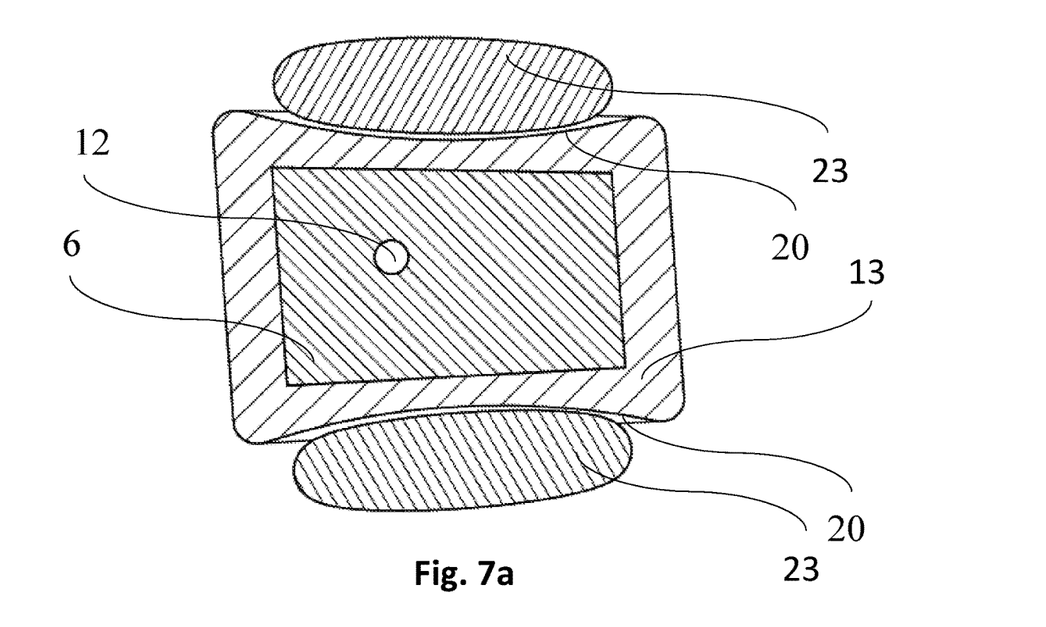
FIGS. 7a-7b are schematic cross-sectional views of the mechanical connection between the side receptor base part of the tip unit and the wind turbine blade shells according to an embodiment of the invention.
Figure 7B:
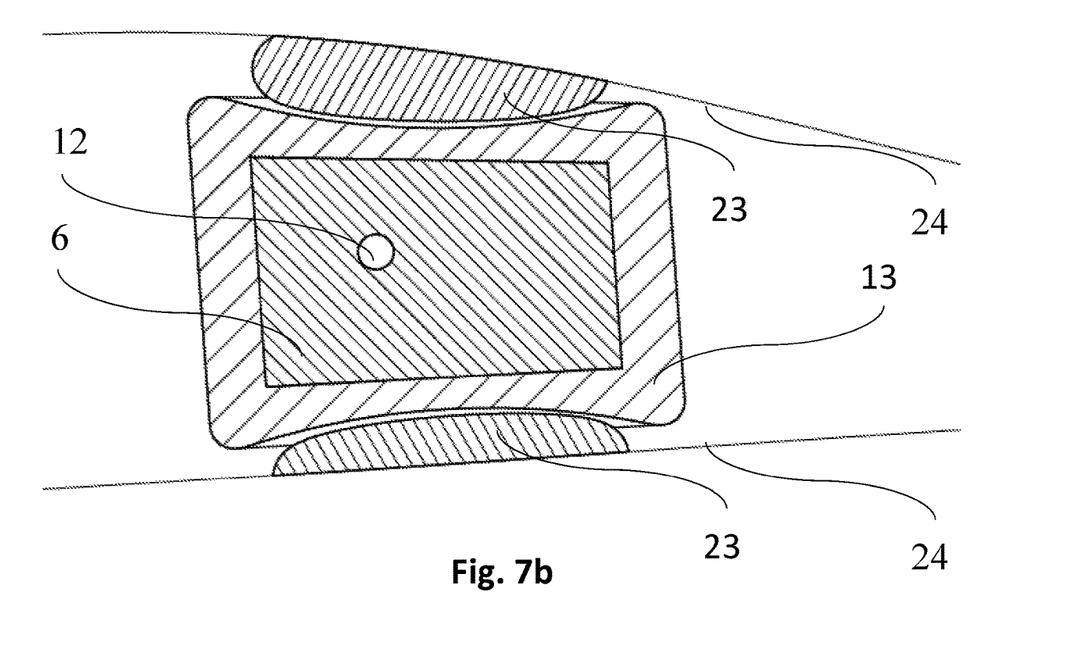

FIGS. 7a-7b are schematic cross-sectional views of the mechanical connection between the side receptor base 6 part of the tip unit 1 and the wind turbine blade shells 24 according to an embodiment of the invention.

An adhesive material 23 is placed in the recesses 20 formed in the insulating material 13 at both ends of the cylinder-shaped part of the tip unit 1 containing the side receptor base 6 as illustrated in FIG. 7a. When the tip unit 1 is arranged between the wind turbine blade shells 24 as indicated in FIG. 7b, this adhesive material 23 ensures airtight connections between the tip unit 1 and the wind turbine blade shells 24.

This means that no air or water can reach a side receptor 7, which is mechanically and electrically connected to the side receptor base 6 through penetration of the shell 24 of the wind turbine blade 2, the adhesive material 23 and the electrically insulating material 13 covering the side receptor base 6. Thereby, the risk of corrosion problems related to the installation of the side receptor 7 and the risk of internal discharges from the otherwise exposed parts of the side receptor 7 within the wind turbine blade shell 24 are significantly reduced.

LIST OF REFERENCE NUMBERS

1. Tip unit
2. Wind turbine blade
3. Tip for wind turbine blade
4. External part of tip
5. Internal part of tip
6. Side receptor base
7. Side receptor
8. Internal tip unit conductor
9. Insulated electric cable
10. Down conductor
11. Root end of wind turbine blade
12. Connection element
13. Insulating material
14. Flange for mounting of external part of tip
15. Mounting holes for external part of tip
16. Recess for pressing tool access
17. Surface for mounting of side receptor
18. Pressing tool
19. Additional insulating material
20. Surface with recess for adhesive
21. Pressing tool
22. Press mark
23. Adhesive material
24. Wind turbine blade shell

The invention claimed is:

1. An insulated tip unit for a lightning protection system for a wind turbine blade, said tip unit comprising an electrically conducting tip for a wind turbine blade, which tip consists of an external part and an internal part, the external part forming a tip receptor, at least one side receptor base made from an electrically conducting material for mechanical mounting of one or more side receptors arranged on an external surface of the blade in such a way that electrical connection is established between the respective side receptor(s) and the side receptor base(s), an internal tip unit conductor for forming an electrical connection between the internal part of the tip and the side receptor base(s), an insulated electric cable for forming an outermost part of a down conductor extending internally within the wind turbine blade in a longitudinal direction thereof from the at least one side receptor base towards a root end of the blade, and a connection element for establishing electrical connection between the insulated electric cable and the other conducting parts of the tip unit, wherein the internal part of the tip, the side receptor base(s), the internal tip unit conductor, the connection element and one end of the insulated electric cable are all embedded in an insulating material leaving only the external part of the tip and the other end of the insulated electric cable uncovered by the insulating material, the insulating material having a first end portion encasing the internal part of the tip, a second end portion encasing the outermost part of insulated electric cable, and a central portion between the first end portion and the second end portion, the central portion fully encasing the at least one side receptor base and the internal tip unit conductor, the first end portion, the second end portion and the central portion form a continuous and uninterrupted unitary construction.

2. The tip unit according to claim 1, wherein the insulated electric cable is an unshielded high-voltage cable.

3. The tip unit according to claim 1, wherein the connection element is integrated in the at least one side receptor base.

4. The tip unit according to claim 3, wherein the internal tip unit conductor is formed by a part of the insulated electric cable.

5. The tip unit according to claim 4, wherein the cable insulation has been removed from a part of the insulated electric cable forming the internal tip unit conductor.

6. The tip unit according to claim 1, wherein a distance between an outermost point of the external part of the tip and a centre of the side receptor base nearest the tip is between 0.3 meters and 2 meters, preferably between 0.8 meters and 1.2 meters.

7. The tip unit according to claim 1, wherein a distance between a centre of the side receptor base furthest away from the tip and a point where the insulated electric cable leaves a cast part of the tip unit is between 0.1 meters and 0.5 meter.

8. The tip unit according to claim 1, wherein the external part of the tip is releasably attached to the remaining part of the tip unit.

9. The tip unit according to claim 1, wherein the external part and the internal part of the tip are integrated into one common part.

10. The tip unit according to claim 1, comprising an adhesive to attach the tip unit to the wind turbine blade by the means of an adhesive.

11. The tip unit according to claim 1, wherein the insulation material comprises at least one material from the list comprising: polymeric materials, polymer nanocomposites, thermoplastic materials, thermoset materials, insulating foams or any combination thereof.

12. The tip unit according to claim 1, wherein a minimum thickness of the cast insulation material is between 3 mm and 30 mm.

13. The tip unit according to claim 1, wherein the insulation material used for the casting is dimensioned to withstand potential differences of at least 20 kV, between the outer surface of the tip unit and the conducting parts inside the tip unit.

14. The tip unit according to claim 1, wherein the external part of the tip consists at least partly of copper or a copper alloy.

15. The tip unit according to claim 1, wherein the external part of the tip consists at least partly of Tungsten Carbide.

16. The tip unit according to claim 1, wherein the external part of the tip consists at least partly of steel.

17. The tip unit according to claim 1, wherein the external part of the tip consists at least partly of aluminium.

18. The tip unit according to claim 1, wherein the internal part of the tip consists at least partly of iron.

19. The tip unit according to claim 1, wherein the internal part of the tip consists at least partly of copper.

20. The tip unit according to claim 1, wherein the internal part of the tip consists at least partly of brass.

21. The tip unit according to claim 18, wherein the internal tip unit conductor is mechanically and electrically connected to the internal part of the tip by means of exothermic welding.

22. The tip unit according to claim 1, wherein the internal part of the tip consists at least partly of aluminium.

23. The tip unit according to claim 22, wherein the internal tip unit conductor is mechanically and electrically connected to the internal part of the tip by a crimped connection.

24. The tip unit according to claim 1, wherein the at least one side receptor base consists at least partly of aluminium.

25. The tip unit according to claim 24, wherein the internal tip unit conductor or the insulated electric cable are mechanically and electrically connected to the at least one side receptor base by Contact Mandrel Crimping.

26. The tip unit according to claim 24, wherein the internal tip unit conductor or the insulated electric cable are mechanically and electrically connected to the at least one side receptor base by exothermic welding.

27. The tip unit according to claim 1, wherein the insulated electric cable is terminated in a cable lug, which is bolted onto a side receptor base.

28. The tip unit according to claim 1, wherein an outer geometry and dimensions of the tip unit for being used in a specific type of wind turbine blades is obtained through customisation of a standardised tip unit having a certain predefined geometry and minimum dimensions by adding extra material to the outer surface of the standardised tip unit.

29. The tip unit according to claim 28, wherein the added extra material is the same insulating material as is used for the tip unit and wherein the insulating material for the tip unit and the addition of the extra material are done in one single process.

30. The tip unit according to claim 28, wherein the added extra material is a foam material added to fill up the cavity between the inner shell of a wind turbine blade and a standardised tip unit arranged therein.

31. A wind turbine blade comprising a tip unit according to claim 1.

* * * * *